July 21, 1953
J. SCHULTZ
2,645,950
ADJUSTABLE SAW CARRIER HOLDER
Filed April 10, 1952
2 Sheets-Sheet 1
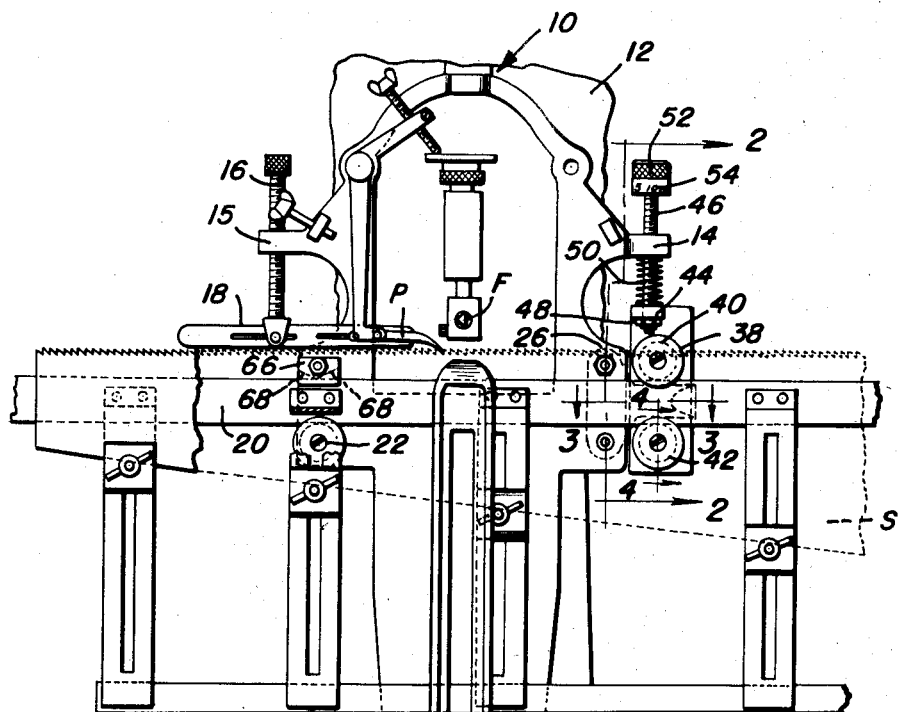
Fig.1.
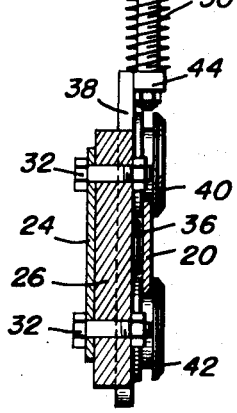
Fig.2.
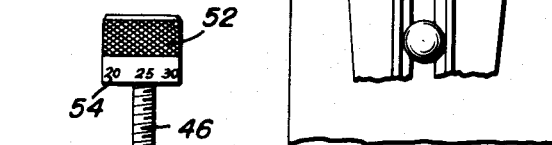
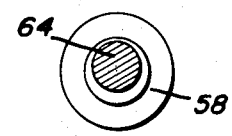
Fig.9.
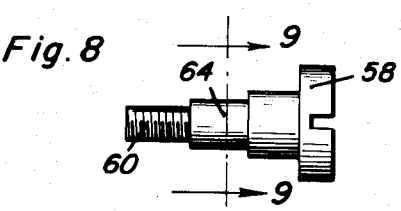
Fig.8
John Schultz
INVENTOR.
BY
Attorneys July 21, 1953  J. SCHULTZ  2,645,950
ADJUSTABLE SAW CARRIER HOLDER
Filed April 10, 1952  2 Sheets-Sheet 2
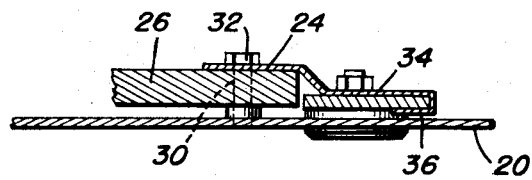
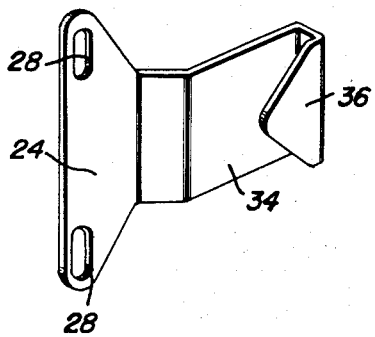
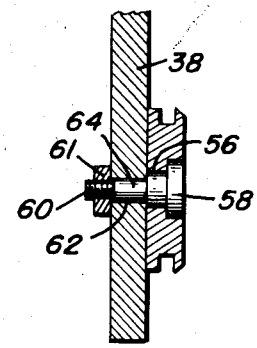
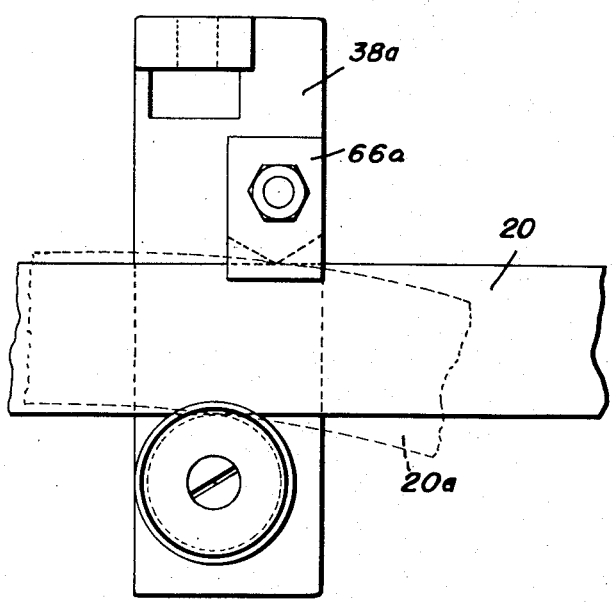
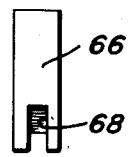
John Schultz
INVENTOR.

Patented July 21, 1953

2,645,950

UNITED STATES PATENT OFFICE 2,645,950

ADJUSTABLE SAW CARRIER HOLDER

John Schultz, New Britain, Conn.

Application April 10, 1952, Serial No. 281,517

4 Claims. (Cl. 76—74)

This invention relates to new and useful improvements in saw filing machines and the primary object of the present invention is to provide an adjustable saw carrier holder for "Foley" saw filers which is adjustable for raising the saw carrier, holding the saw, up to the file for proper precision filing depth avoiding lowering or changing the position of the set file ends after each cut across the saw.

Another important object of the present invention is to provide an adjustable saw carrier holder for filing machines that will obviate the heretofore step of lowering both ends of a file after each cut, which frequently results in upsetting the even filing stroke and slippage of the feed pawl.

Another objection of the present invention is to provide an adjustable saw carrier holder that is quickly and readily attached to or removed from a "Foley" saw filing machine in a convenient manner without disturbing the normal structure of such a machine.

Yet another object of the present invention is to provide a device of the aforementioned character that is quickly and readily adjusted to a predetermined position by manual actuation of an adjusting screw.

A further object of the present invention is to provide an adjustable saw carrier holder that is adaptable for both straight saw carriers and curved or crowned carriers.

A still further aim of the present invention is to provide an adjustable saw carrier holder that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary front elevational view of a "Foley" saw filing machine and showing the present invention mounted thereon;

Figure 2 is an enlarged detail vertical sectional view taken substantially on the plane of section line 2—2 of Figure 1;

Figure 3 is an enlarged horizontal sectional view taken substantially on the plane of section line 3—3 of Figure 1;

Figure 4 is an enlarged fragmentary vertical sectional view taken substantially on the plane of section line 4—4 of Figure 1;

Figure 5 is a perspective view of the guide member used in conjunction with the present invention;

Figure 6 is a front elevational view of the guide holding member in slightly modified form over the construction shown in Figures 1–3 inclusive;

Figure 7 is a side view of the guide attached to the plate illustrated in Figure 6;

Figure 8 is an elevational view of the carrier guide fastening means; and,

Figure 9 is a transverse vertical sectional view taken substantially on the plane of section line 9—9 of Figure 8.

Referring now to the drawings in detail, wherein for the purpose of illustration, there is disclosed a preferred embodiment of the present invention, the numeral 10 represents a well known type of saw filing machine including a frame 12 having horizontally projecting ears or sleeves 14 and 15 at each side that receivably engage precision screws 16 which are attached to jointing guides 18. The machine 10 also includes a saw carrier 20 and guide rollers 22 that slidably receive the saw carrier 20.

In order to accommodate the present invention, the right jointing guide and its precision screw are removed and the upper and lower carrier guides on the right side of the machine are also removed. A plate element 24 rests against the rear face of frame portion 26 and is formed with apertures 28 that register with apertures 30 in frame portion 26 normally receiving the pivots for the upper and lower guides. Fasteners 32 extend through the apertures 28 and 30 and removably secure the plate element against portion 26, as shown best in Figure 2.

Plate element 24 includes a horizontally projected arm 34 terminating in a guide channel 36 that slidably receives a vertically adjustable plate 38. Upper and lower guide rollers 40 and 42 are rotatably supported on the forward face of plate 38 and receive the upper and lower edges of carrier 20.

An ear or sleeve 44 is formed on the upper end of plate 38 and rotatably receives the lower end of a vertical adjusting screw 46 that is threaded in ear 14. A nut 48 threaded on the lower end of screw 46 is disposed under ear 44 and a coil spring 50 embraces the screw 46 and is biased between the ears 44 and 14 to yieldingly urge the ear 44 against nut 48.

The upper knurled surfaced head end 52 of screw 46 is provided with circumferentially spaced graduations or scale markings 54 to indicate to what extent the plate 38 has been raised or lowered as the screw 46 is manually rotated. The screw 46 is held in its rotated position by the spring 50 urging the nut 48 and ear 44 into engagement with each other.

Rollers 40 and 42 are each provided with a central countersunk opening 56 through which the fasteners 58 for the rollers extend. The rear threaded ends 60 of the fasteners 58 project through apertures 62 in the plate 38 and receivably engage nuts 61. The shanks of the fasteners 58 are formed with cam portions or eccentrics 64 that enter the apertures 62. The portions 64 are rotated to permit selective raising or lowering of the rollers to compensate for wear.

The upper left hand carrier guide 66 has a lower edge whose corners are formed with downwardly converging slots 68 forming clearance for the upper edge of the carrier as the plate 38 is raised or lowered. A guide, 66a similar to guide 66, may be used with a plate 38a as a replacement for the upper right hand carrier guide as shown in Figure 6, so that the device may be applicable for curved or crown carriers 20a as well as straight carriers such as 20.

By adjusting the feed screw 46, the saw S may be brought up into engagement with the file F of the machine 10 after each cut, for precision depth, and retains the saw in the same filing position and in engagement with the feed pawl P.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of invention as herein described and the scope of the appended claims.

Having described the invention, what is claimed as new is:

1. In a saw filer including a frame having an internally threaded ear normally receiving a precision screw for a jointing guide, an adjustable saw carrier holder comprising a holding member secured to the frame, a plate slidably held by the holding member, carrier guides mounted on the plate, a vertical adjusting screw threaded in the ear, a sleeve on the plate receiving the lower end of said adjusting screw, an abutment on the screw under the sleeve, and a spring embracing the screw and biased between the sleeve and the ear and urging the sleeve and abutment against each other.

2. In a saw filing machine including a frame having an ear with a vertically disposed internally threaded aperture, a guide and holding arm attached to the frame below and spaced from the ear and having a terminal channel, a vertically slidable plate slidably received in the channel, upper and lower carrier guides on the plate, and an adjusting screw threaded in said aperture and attached to the plate for selectively raising and lowering the plate, one of said guides comprising a roller having a central opening, a pivot for the roller threaded to the frame and having a cam surfaced shank portion extending through the opening.

3. In a saw filer including a frame having an internally threaded ear normally receiving a precision screw for a jointing guide, an adjustable saw carrier holder comprising a holding member secured to the frame, a plate slidably held by the holding member, carrier guides mounted on the plate, a vertical adjusting screw threaded in the ear, a sleeve on the plate receiving the lower end of said adjusting screw, an abutment on the screw under the sleeve, and a spring embracing the screw and biased between the sleeve and the ear and urging the sleeve and abutment against each other, said adjusting screw including a head having circumferentially spaced graduations thereon to indicate adjustment of the screw.

4. In a saw filing machine including a frame having an ear with a vertically disposed aperture, said frame also having a portion below the ear with two openings therein, a plate member secured to the portion by fasteners passing through the openings, said plate member having an arm portion terminating in a channel, a plate slidably received by the channel and movable toward and away from the ear, upper and lower carrier guides on the plate, a screw threaded in the aperture and attached to the plate for adjusting the plate toward and away from the ear, and a spring about the screw and biased between the plate and the ear, said screw having an abutment at its lower end and said plate having an ear receiving the screw and engaging the abutment.

JOHN SCHULTZ.

References Cited in the file of this patent

UNITED STATES PATENTS

| Number | Name | Date |
|---|---|---|
| 534,419 | Bauer | Feb. 19, 1895 |
| 560,464 | Bertram | May 19, 1896 |
| 579,103 | Ballew | Mar. 16, 1897 |
| 612,698 | Bolton | Oct. 18, 1898 |
| 1,196,370 | La Fontaine | Aug. 29, 1916 |
| 1,668,361 | Foley | May 1, 1928 |
| 2,245,982 | Knowles | June 17, 1941 |
| 2,302,960 | Knutson | Nov. 24, 1942 |
| 2,498,167 | Lorenz | Feb. 21, 1950 |